(12) United States Patent
Jonas et al.

(10) Patent No.: US 8,369,068 B2
(45) Date of Patent: Feb. 5, 2013

(54) TRANSFER SWITCH ENCLOSURE

(75) Inventors: Jeffrey J. Jonas, Waukesha, WI (US); Mark J. Bethke, Racine, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 340 days.

(21) Appl. No.: 12/784,614

(22) Filed: May 21, 2010

(65) Prior Publication Data
US 2011/0286155 A1 Nov. 24, 2011

(51) Int. Cl.
*H02B 1/04* (2006.01)
(52) U.S. Cl. ............ 361/647; 361/631; 361/643
(58) Field of Classification Search .......... None
See application file for complete search history.

(56) References Cited

U.S. PATENT DOCUMENTS

| | | | | |
|---|---|---|---|---|
| 3,906,295 A | * | 9/1975 | Tessmer | 361/643 |
| 4,423,336 A | * | 12/1983 | Iverson et al. | 307/64 |
| 6,046,904 A | * | 4/2000 | Kubat | 361/659 |
| 6,088,219 A | * | 7/2000 | Yanniello et al. | 361/657 |
| 6,603,660 B1 | * | 8/2003 | Ehn et al. | 361/694 |
| 7,599,171 B1 | * | 10/2009 | Remmert | 361/631 |
| 2010/0128418 A1 | * | 5/2010 | Pruehs et al. | 361/664 |

* cited by examiner

*Primary Examiner* — Gregory Thompson
(74) *Attorney, Agent, or Firm* — Boyle Fredrickson, S.C.

(57) ABSTRACT

A transfer switch enclosure is provided for housing a transfer switch that selectively connects a load to either a utility electrical grid or a stand-by electrical generator. The utility connection includes a first switch selectively connecting utility power to a load. The transfer switch selectively connects the load to either the utility power or a secondary power source. The housing includes a divider panel, providing two separate chambers in the housing. The utility connection is mounted in one of the chambers and the transfer switch is mounted in the other of the chambers. The divider panel includes an opening to permit a pair of electrical conductors to pass therethrough for connecting the utility switch to the transfer switch. The housing further includes two door panels, each door panel covering one of the two chambers. Each door panel is independently operable and securable, controlling access to each of the two chambers.

18 Claims, 3 Drawing Sheets

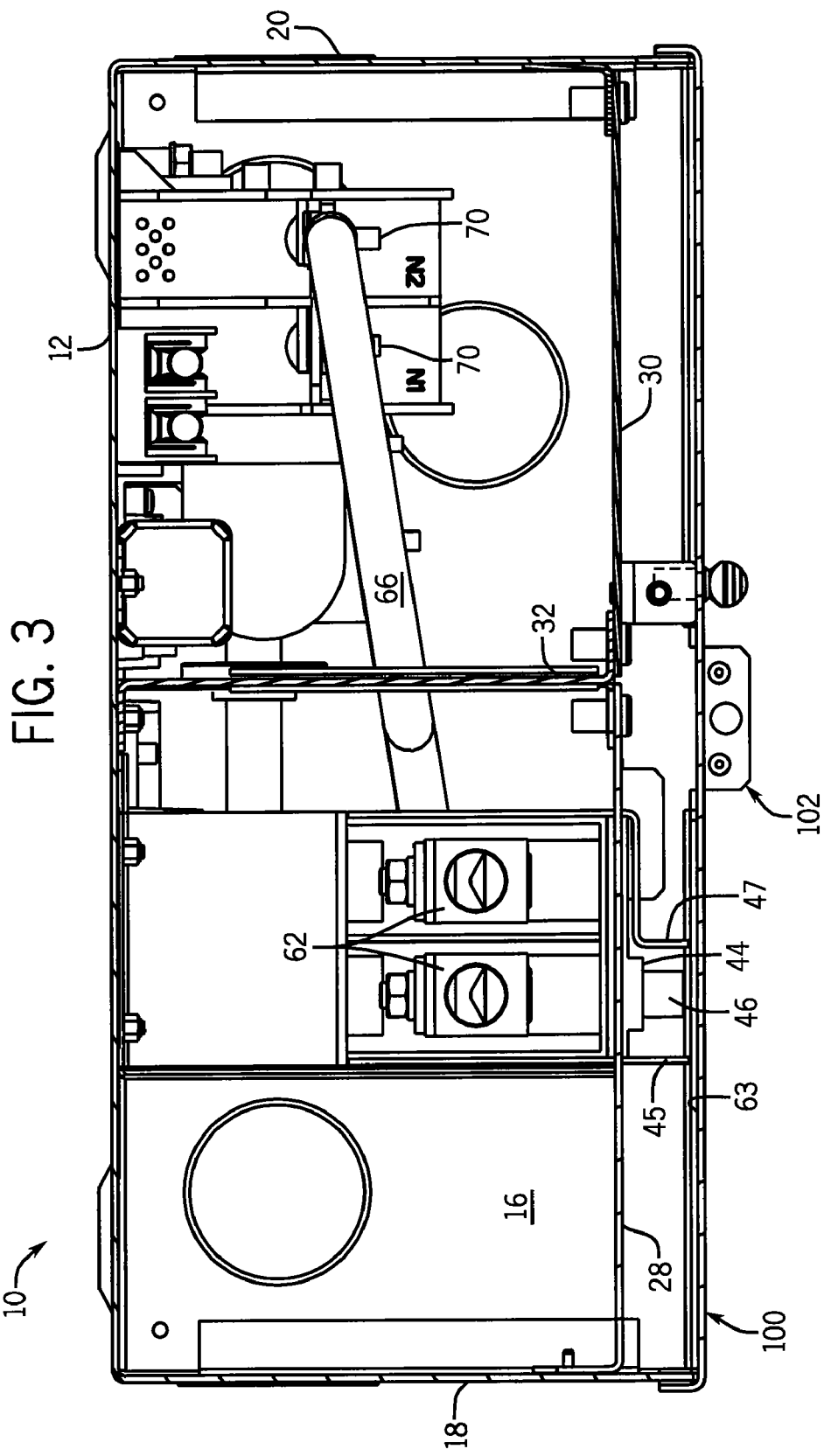

TRANSFER SWITCH ENCLOSURE

FIELD OF THE INVENTION

The present invention relates generally to stand-by electrical generators, and in particular, to an enclosure for housing a transfer switch that selectively connects a load to either a utility electrical grid or a stand-by electrical generator.

BACKGROUND AND SUMMARY OF THE INVENTION

As is known, virtually all residential homes utilize electrical power received from a utility company. Typically, utility companies have an excellent record of providing uninterrupted or infrequently interrupted power to their customers at proper voltage levels and line frequency. However, due to the increasing demand for power, power outages have become more frequent. While power outages usually last only for a short duration, an extended power outage may cause more than simple aggravation for customers of the utility. A power outage may render a homeowner's appliances, such as the sump pump, refrigerator or freezer inoperable. If a power outage occurs during a rainstorm, the failure of the sump pump to operate may result in the flooding of the homeowner's basement.

In order to combat these occasional disruptions in service, many residential customers of the utility companies have equipped their homes with stand-by electrical generator systems. These stand-by electrical generator systems include internal combustion engines that drive electrical generators. If the commercial power from the utility company fails, the internal combustion engine of the stand-by electrical generator system is started, either manually or automatically, causing the electrical generator to generate electrical power. When the electrical power generated by the electrical generator reaches the proper voltage and frequency desired by the customer, a transfer switch transfers the load imposed by the homeowner from the utility power lines to the electrical generator.

Installation of a stand-by electrical generator system requires the ability to switch the load imposed by the homeowner between the utility power lines and the stand-by electrical generator. Typically, these connections are established by a pair of switches. The first switch may be, for example, a circuit breaker receiving an electrical connection from the utility power line on a first side of the switch and providing a connection point on the other side of the switch to provide utility power to the load. The second switch may be, for example, a transfer switch which selectively connects the utility power line or the stand-by electrical generator to the load imposed by the homeowner. Typically, both switches are provided in a single enclosure. However, connections to the utility power line and to the stand-by generator are often performed by separate electricians at different times. Additionally, the utility company may wish to control access to the utility supply lines entering the enclosure.

Therefore, it is a primary object and feature of the present invention to provide an enclosure for housing a transfer switch that selectively connects a load to either a utility electrical grid or a stand-by electrical generator.

It is a further object and feature of the present invention to provide an enclosure for housing a transfer switch wherein the electrical connections to a utility electrical grid and to a stand-by electrical generator housed therein are physically isolated from each other.

It is a still further object and feature of the present invention to provide an enclosure for housing a transfer switch which provides independent and secure access to the electrical connections to a utility electrical grid and to a stand-by electrical generator housed therein.

In accordance with the present invention, a housing is provided for a transfer switch. The housing includes an enclosure defined by a back panel having a front surface; a plurality of sides extending from the back panels and defining a chamber; and a divider panel positioned in the chamber for dividing the chamber into a first volume and a second volume. A first door panel is operatively connectable to the enclosure for selectively preventing access to the first volume. A second door panel is operatively connectable to the enclosure for selectively preventing access to the second volume.

The first door panel and the second door panel are independently secured to the enclosure. The first door panel includes a locking arrangement operatively connectable to the enclosure to positively retain the first door panel in a closed position preventing access to the first volume. The first door panel includes an opening extending therethrough to receive a first switch member. The first switch member is movable between a first position and a second position. A locking arrangement is provided for securing the first switch member in one of the first and second positions. The second door panel also includes an opening extending therethrough and the transfer switch includes a second switch member. A cover panel is removably connectable to the enclosure over at least a portion of the first and second door panels to prevent access to the first and second switch members.

One of the plurality of sides has a utility opening extending therethrough. The front surface of the back panel includes a first mounting surface communicating with the first volume for receiving a first switch thereon. The first switch further includes a first pair of terminals configured to receive a pair of electrical conductors connected to a utility grid and a second pair of terminals configured to receive a pair of electrical conductors connected to a load. The first switch member selectively connects the load to the utility grid. One of the plurality of sides has a load opening extending therethrough and the front surface of the back panel includes a second mounting surface communicating with the second volume for receiving the transfer switch thereon. The divider panel includes an opening for allowing communication between the first and second volumes.

In accordance with a further aspect of the present invention, a housing is provided for a transfer switch. The housing includes a back panel; a top panel joined along a first edge of the back panel; a bottom panel joined along a second edge of the back panel; a first side panel joined along a third edge of the back panel between the top panel and the bottom panel; and a second side panel joined along a fourth edge of the back panel between the top panel and the bottom panel such that the top panel, bottom panel, first side panel, and second side panel define a chamber having an opening thereto. A first door panel selectively covers a first portion of the opening. A second door panel selectively covers a second portion of the opening. A divider panel extends from a front surface of the back panel between the top panel and the bottom panel. The divider panel divides the chamber into a utility connection volume defined by the top panel, the divider panel, the bottom panel, and the first side panel and a transfer switch connection volume defined by the top panel, the divider panel, the bottom panel, and the second side panel. The divider panel includes an aperture extending therethrough for allowing the utility connection volume to communicate with the transfer switch connection volume.

The first door panel and the second door panel are independently secured to at least one of the top panel, bottom panel, first side panel, and second side panel. The first door panel includes a locking arrangement for retaining the first door panel in a closed position so as to prevent access to the utility connection volume through the first portion of the opening. A first switch is received in the utility connection volume and is supported by the front surface of the back panel. The first switch includes a first switch member movable between a first switch position and a second switch position to selectively connect a load to a utility power supply. The first door panel includes a switch opening extending therethrough for receiving the first switch member. A locking structure is provided for maintaining the first switch member in one of the first or second switch positions.

It is contemplated for the transfer switch to be received in the transfer switch connection volume and to be supported by the front surface of the back panel. The transfer switch includes a second switch member movable between a first switch position and a second switch position to selectively connect a load to one of the utility power supply and a secondary power supply. The second door panel includes a switch opening extending therethrough for receiving the second switch member. A cover panel is removably connected to at least one of the top panel, bottom panel, first side panel, and second side panel so as to cover at least a portion of the first and second door panels to prevent access to the first and second switch members.

It is further contemplated that one of the top panel, the bottom panel, and the first side panel has a utility opening extending therethrough. The first switch further includes a first pair of terminals configured to receive a pair of electrical conductors connectable to the utility power supply and a second pair of terminals configured to receive a pair of electrical conductors connectable to the load. In addition, one of the top panel, the bottom panel, and the second side panel has a load opening extending therethrough. The transfer switch is operatively connected to the front surface of the back panel and is received in the transfer switch connection volume. The transfer switch selectively connects the load to either the utility grid or the secondary power supply by operation of the one of a manually operated switch member and an electronically controlled switch member.

In accordance with a still further aspect of the present invention, a housing is provided for a transfer switch. The housing includes an enclosure defining first and second volumes. The enclosure has a first opening for providing access to the first volume and a second opening for providing access to the second volume. A first door panel is operatively connected to the enclosure and is movable between a first open position and a second closed position for preventing access to the first volume. A second door panel is operatively connected to the enclosure and is movable between a first open position and a second closed position for preventing access to the second volume. The first volume is adapted for receiving electrical connections to a utility and the second volume is adapted for receiving the transfer switch.

The enclosure includes a generally flat back panel having a forward surface. First and second spaced vertical sides extend from the back panel and first and second spaced horizontal sides extending from the back panel. The first and second horizontal sides interconnect the first and second vertical sides such that the first and second horizontal sides and the first and second vertical sides defining a chamber in the enclosure. A divider panel is positioned in the chamber for dividing the chamber into the first volume and second volume. The divider panel includes an aperture extending therethrough to connect the first and the second volumes. A lock arrangement is operatively connectable to the enclosure for maintaining the first door panel in the closed position.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 3 is a cross-sectional view of the transfer switch enclosure of the present invention taken along line 3-3 of FIG. 1.

DETAILED DESCRIPTION OF THE PREFERRED EMBODIMENTS

The various features and advantageous details of the subject matter disclosed herein are explained more fully with reference to the non-limiting embodiments described in detail in the following description.

Figure 1:
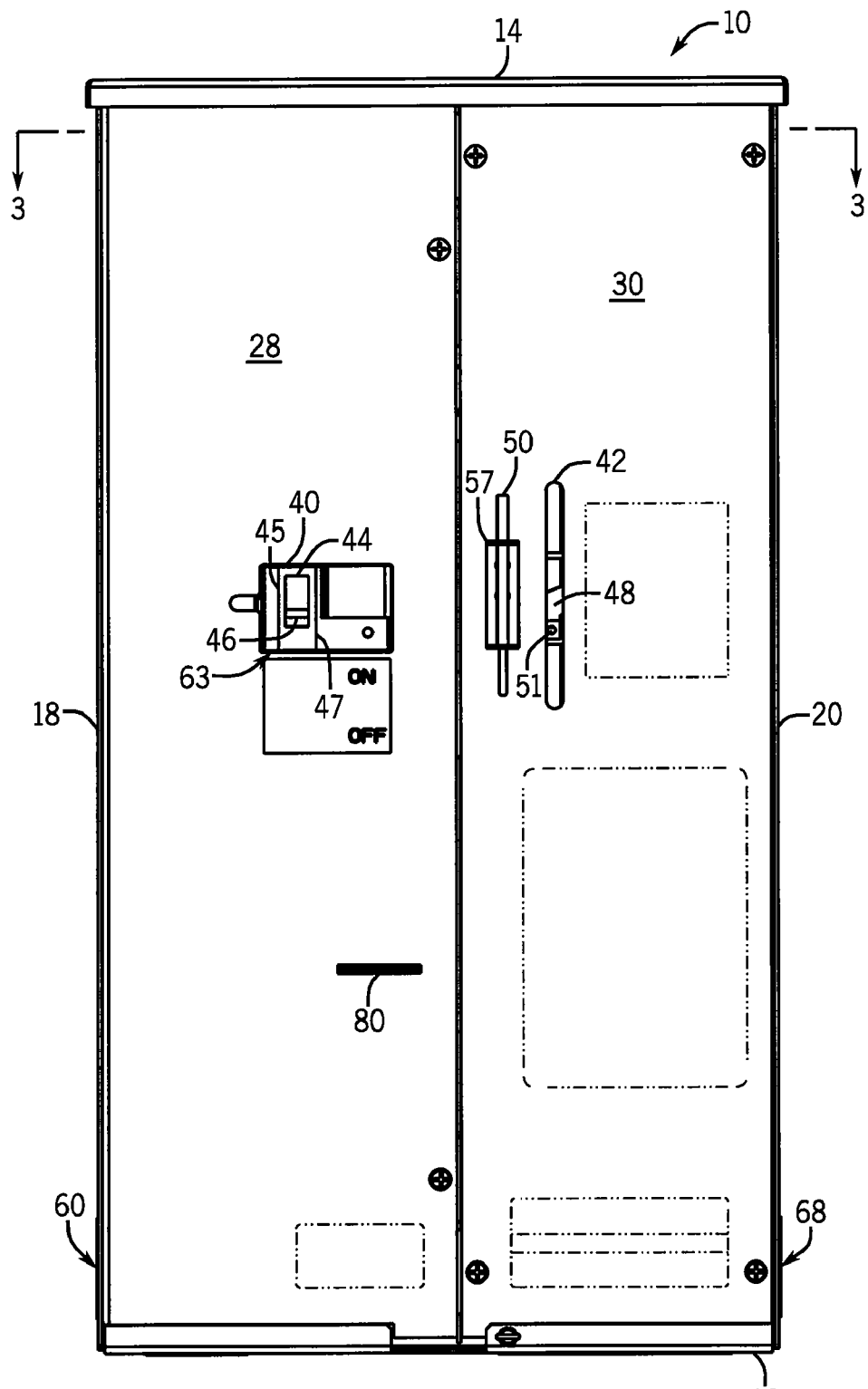
FIG. 1 is a front elevational view of a transfer switch enclosure in accordance with the present invention.
Figure 2:
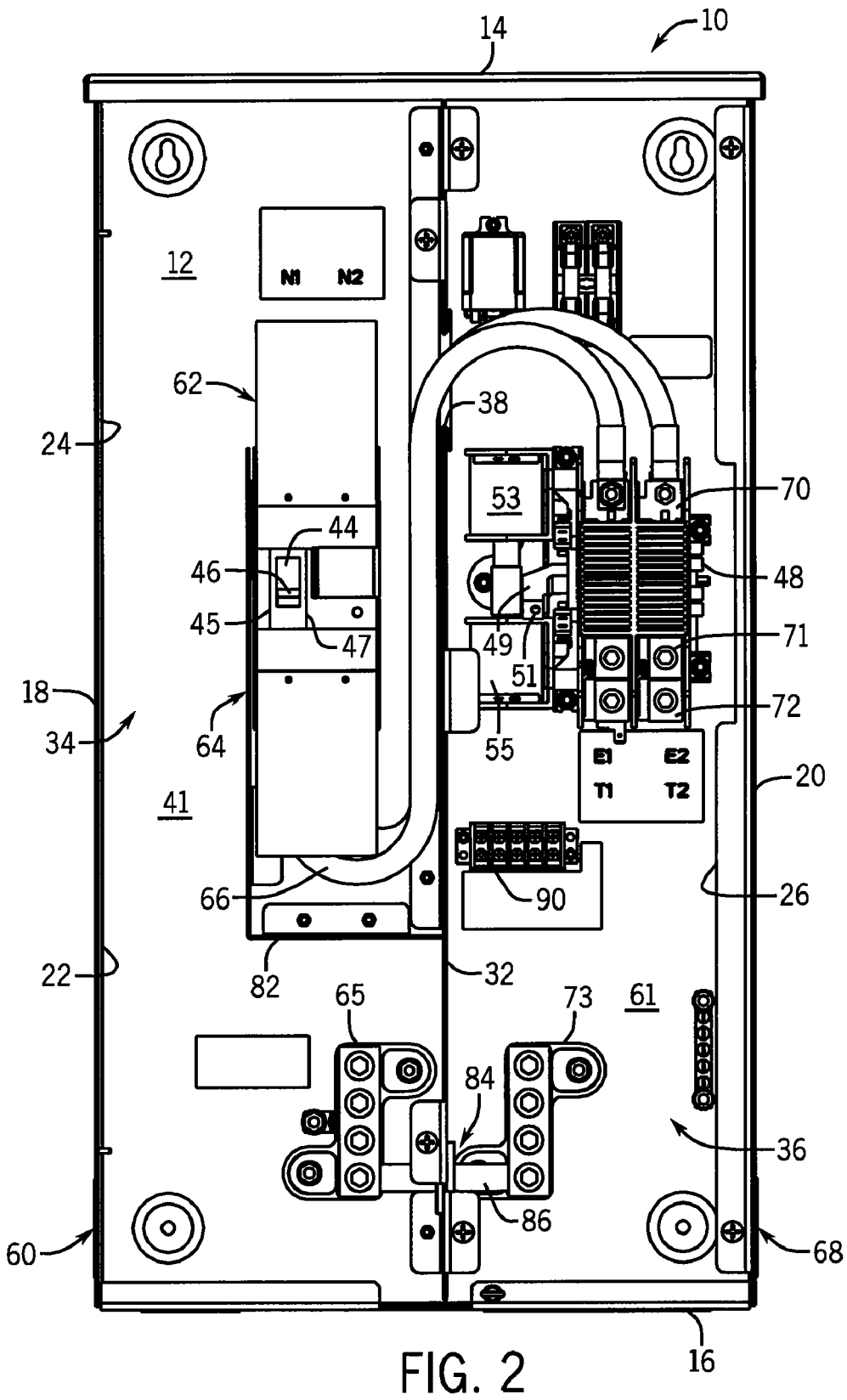
FIG. 2 is a front elevational view of the transfer switch enclosure of FIG. 1 with the front door panels removed.

Referring to FIGS. 1-3, a transfer switch enclosure in accordance with the present invention is generally designated by the reference numeral 10. It is intended for enclosure 10 to house a transfer switch, e.g., switch 48 hereinafter described, and the electrical connections associated therewith. The enclosure 10 is preferably generally rectangular in shape, but it can be appreciated that other configurations are possible without deviating from the scope of the present invention. The enclosure 10 is defined by a back panel 12 and first and second side panels 18 and 20, respectively, extending from the front surface of the back panel 12 along opposite edges thereof. It is contemplated for a top panel 14 to extend along an upper edge of the back panel 12 and for a bottom panel 16 to extend along a bottom edge of the back panel 12, which is opposite the upper edge. The first and second side panels 18 and 20, respectively, interconnect the top panel 14 and the bottom panel 16. The top panel 14, bottom panel 16, first side panel 18, and second side panel 20 cooperate to define an opening 22 on the front side of the enclosure 10.

The enclosure 10 includes at least one divider panel 32 defining, at least in part, two volumes within the enclosure 10. The divider panel 32 extends from the front surface of the back panel 12 and interconnects the top panel 14 and the bottom panel 16. A first volume 34 is defined by the top panel 14, the first side panel 18, the bottom panel 16, and the divider panel 32. A second volume 36 is defined by the top panel 14, the second side panel 20, the bottom panel 16, and the divider panel 32. Optionally, it is contemplated for the divider panel 32 to be constructed of multiple panel segments and the multiple panel segments may be arranged in any suitable configuration to define at least two separate volumes within the enclosure 10. An aperture 38 extends through the divider panel 32 and is sized to permit a pair of electrical conductors 66 to pass through from the first volume 34 to the second volume 36. Optionally, the aperture 38 may be defined by a space between a first and a second multiple panel segment.

The first volume 34 is configured to contain the utility electrical connections. A first switch 44 is positioned on a mounting area portion 41 of the front surface of the back panel 12. The first switch 44 may be for example a circuit breaker, as is known in the art, including a first set of terminals 62, or lugs, for connecting electrical conductors to the utility power supply and a second set of terminals 64, or lugs, for connecting electrical conductors 66 between the first switch 44 and a second switch 48. The first switch 44 includes a first switch member 46 movable between a first position and a second position to selectively establish an electrical connection between the first set of terminals 62 and the second set of terminals 64. The first volume 34 also contains a neutral connection point 65 to connect a third electrical conductor, providing a neutral connection, to the utility power supply.

It is contemplated to provide one or more knockouts in the panels defining the first volume 34. A knockout is a partially punched opening in one of the panels which may be easily removed to establish an opening in the panel, permitting, for example, a conduit to pass through and be connected to enclosure 10. By way of example, an opening 60 in the first side panel 18 may be provided by punching out the center portion of a knockout to permit a conduit, and hence, the electrical conductors connecting the utility power supply to the first switch 44, to pass therethrough.

The second volume 36 is preferably configured to contain the transfer switch electrical connections. The second switch 48 is positioned on a second mounting area portion 61 on the front of the back panel 12. The second switch 48, e.g., a transfer switch, permits a load to be connected to either the utility power supply or a secondary power supply, such as a stand-by generator, while preventing a simultaneous electrical connection between the utility power supply and the secondary power supply. The transfer switch 48 includes a first set of terminals 70, or lugs, for connecting electrical conductors to the utility power supply, a second set of terminals 72, or lugs, for connecting electrical conductors between the transfer switch 48 and the load, and a third set of terminals 71, or lugs, for connecting electrical conductors between the transfer switch 48 and the secondary power supply. The transfer switch 48 includes a switch member 49 movable between a first position and a second position to selectively establish an electrical connection between the load terminals 72 and either the utility power supply terminals 70 or the secondary power supply terminals 71.

The transfer switch 48 is configured to be manually and/or automatically switched between the first and second switch positions. If the transfer switch 48 is configured to be automatically switched, a first coil 53 and a second coil 55 are provided. The first coil 53 energizes a solenoid that moves the switch member 49 to the first switch position, connecting the utility power supply to the load. The second coil 55 energizes a solenoid that moves the switch member 49 to the second switch position, connecting the secondary power supply to the load. For automatic switching, the second volume 36 also includes connections to an external controller. Preferably, a connection block 90 is provided to establish the electrical connections to the external controller. The connection block 90 may include, but is not limited to, terminals that connect the utility supply to the external controller and terminals that provide command signals from the external controller which selectively energize the first coil 53 or the second coil 55. The external controller is preferably an integral component of the secondary power supply, such as an external generator. Optionally, any suitable controller, such as a programmable logic controller (PLC) may be connected to the connection block 90.

If the transfer switch 48 is configured to be manually switched, a switch handle 50 is provided to move the switch member 49 between the first and second switch positions. The switch handle 50 may be removably connected to the switch member 49. When removed, the switch handle 50 may be stored in a bracket 57 mounted on the front side of the second door panel 30. Preferably, the switch handle 50 is a rod that may be inserted into an opening 51 in the switch member 49 to move the switch member 49 between switch positions.

The second volume also contains a neutral connection point 73 for connecting an electrical conductor to the neutral connection for both the load and the secondary power supply. Preferably the neutral connection point 73 in the second volume 36 is electrically connected to the neutral connection point 65 in the first volume 34. A second aperture 84 may be provided in the divider panel 32 to permit a neutral jumper wire 86 passing through the second aperture 84 to connect each of the neutral connection points, 65 and 73.

At least one knockout may be provided in one of the panels defining the second volume. Preferably, separate knockouts are provided to permit electrical conductors for power connection and control connections to enter the enclosure 10 separately. By way of example, an opening 68 in the second side panel 20 may be provided by punching out the center portion of a knockout to permit the electrical conductors connecting the load and the secondary power supply to the transfer switch 48 to pass therethrough.

The opening 22 in the enclosure 10 is covered by at least two door panels. A first door panel 28 covers a first portion 24 of the opening 22, defined by the first volume 34, and a second door panel 30 covers a second portion 26 of the opening 22, defined by the second volume 36. Each door panel, 28 and 30, engages the enclosure 10 independently of the other door panel, 28 and 30, to be selectively opened or closed over its respective volume, 34 and 36. Each door panel, 28 and 30, may be removably mounted, for example by screws or bolts; pivotably connected, for example by a hinged member; or engage the enclosure 10 by any other suitable means as is known in the art.

The first door panel 28 covers the first volume 34 containing the utility electrical connections. The first door panel 28 includes a first opening 40 positioned such that when the first door panel 28 is in the closed position, the first switch member 46 extends, at least in part, through the first opening 40. The first door panel 28 also includes a second opening 80 positioned such that when the first door panel 28 is in the closed position, a securing member 82 extends through the second opening 80. The securing member may be, but is not limited to, a u-shaped metal rod or a plate with a hole passing therethrough. It is intended for the hole to be located on the portion of securing member 82 outside of the door panel 28 when the door panel 28 is in the closed position, FIG. 3. The securing member 82 may be preferably mounted to the front surface of the back panel 12 but, optionally, may be mounted to any suitable surface within the first volume 34 such as divider panel 32. A locking device, such as a pin or rod, may be inserted between the u-shaped portion of the rod or through the hole in the plate to prevent the door panel 28 from being opened. Preferably the locking device is securable, for example, the rod may be the shackle of a padlock and the padlock is secured by a key or combination. Thus, the first door panel 28 is securable independently of the second door panel 30.

The first door panel 28 also includes a bracket 63 positioned about the opening 40 and extending from the first switch 44. The bracket 63 may be secured to the first door panel 28, to the back panel 12, or any other suitable surface. The bracket 63 includes a first plate portion 45 extending generally in a first plane on one side of the switch member 46 and a second plate portion 47 extending generally in a second plane generally parallel to the first plane on the other side of the switch member 46. Each of the first and second plate portions 45 and 47, respectively, of the bracket 63 extend through the opening 40 when the first door panel 28 is in a closed position and further include corresponding openings (not shown) extending therethrough. The opening in the first plate portion 45 is generally aligned with the opening in the second plate portion 47, and the openings are positioned so as to be located outside of the door panel 28 when the door panel 28 is in the closed position. The bracket 63 is positioned with respect to the first switch 44, such that the openings in the first and second plate portions 45 and 47, respectively, are generally aligned with the center of the first switch member 46 such that the first switch member 46 passes between the openings in the first and second plate portions 45 and 47, respectively, when moving between the first and second switch positions.

The second door panel 30 covers the second volume 36, preferably containing the transfer switch electrical connections. The second door panel 30 includes an opening 42 positioned such that when the second door panel 30 is in the closed position, the opening 51 in the switch member 49 is aligned with the opening 42 in the second door panel 30. The switch handle 50 is inserted into the switch opening 51 through the opening 42 in the door panel 30. The opening 42 in the second door panel 30 is preferably elongated such that the switch handle 50 may be moved between the first and second switch positions while inserted through the opening 42 in the door panel 30.

It is contemplated for the enclosure 10 to further include an outer cover 100 connected to the front of the enclosure 10. The outer cover 100 is preferably removably mounted to the enclosure 10, for example by screws or bolts, and supported by flange 102. Optionally, the outer cover 100 may be pivotably connected to the enclosure 10, for example by a hinged member. In an open or removed state, the outer cover 100 will allow access to each of the first and second door panels 28 and 30, respectively, along with the respective switches and locking means extending through each door panel. In a closed, or connected, state, the outer cover 100 prevents access to each of the first and second door panels, 28 and 30, and the respective switches and locking means extending through the first and second door panels 28 and 30, respectively.

In operation, the enclosure 10 provides separate access to each of the first and second volumes, 34 and 36, such that the electrical connections to the utility power supply may be made separately of the electrical connections to the secondary power supply. For example, a representative from the utility company may first make the electrical connections to the utility power supply. The first door panel 28 is opened, providing access to the first volume 34. Electrical conductors are run from the utility supply to the first switch 44 and to the neutral block 65 in the first volume 34. A second set of electrical conductors 66 are connected between the first switch 44 and the transfer switch 48, and the neutral jumper wire 86 is connected between each of the neutral connection points, 65 and 73. Having established the electrical connections to the utility power supply, the first door panel 28 is then closed over the first volume 34.

The first door panel 28 and the first switch 44 may then be secured as desired. A rod or pin, and preferably a securable device such as a padlock, may be inserted through each of the openings in the first and second plate portions, 45 and 47, of the bracket used to secure the first switch 44. The shackle of the padlock interferes with the travel of the first switch member 46 preventing the first switch member 46 from moving between the first and second switch positions. Thus, the padlock can lock the first switch 44 in either the on or off position. Preferably, the first switch 44 is locked in the off position until the electrical connections to the transfer switch 48 in the second volume 36 are completed. Similarly, a locking device, preferably a securable device such as a padlock, may be inserted through the hole in the securing member 82 extending through the second opening 80 in the first door panel 28. The locking device retains the first door panel 28 in the closed position, preventing access to the first volume 34 and the utility electrical connections. The locking means provided on the first door panel 28 permits, for example, the utility company to control access to the utility supply.

Another electrician may subsequently establish the electrical connections to the secondary power supply. More specifically, with the second door panel 30 opened, access is provided to the second volume 36. Electrical conductors are run from each of the secondary power supply and the load to the appropriate terminals on the transfer switch 48 and to the neutral block 73 in the second volume 36. If automatic control of the transfer switch is desired, electrical connections are similarly made to the connection block 90 in the second volume. Having established the electrical connections to the load and the secondary power supply, the second door panel 30 is then closed over the second volume 36.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A housing for a transfer switch, the transfer switch including a switch member, the housing comprising:
   an enclosure defined by:
      a back panel having a front surface;
      a plurality of sides extending from the back panel and defining a chamber;
      a divider panel positioned in the chamber for dividing the chamber into a first volume and a second volume;
   a first door panel operatively connectable to the enclosure for selectively preventing access to the first volume, the first door panel including an opening extending therethrough to receive a first switch member; and
   a second door panel operatively connectable to the enclosure for selectively preventing access to the second volume, the second door panel including an opening extending therethrough to receive the switch member of the transfer switch.

2. The housing of claim 1 wherein the first door panel and the second door panel are independently secured to the enclosure.

3. The housing of claim 2 wherein the first door panel includes a locking arrangement operatively connectable to the enclosure to positively retain the first door panel in a closed position preventing access to the first volume.

4. The housing of claim 1 wherein the first switch member is movable between a first position and a second position and wherein the housing further comprises a locking arrangement for securing the first switch member in one of the first and second positions.

5. The housing of claim 1 further comprising a cover panel removably connectable to the enclosure over at least a portion of the first and second door panels to prevent access to the first and second switch members.

6. A housing, comprising:
a back panel;
a top panel joined along a first edge of the back panel;
a bottom panel joined along a second edge of the back panel;
a first side panel joined along a third edge of the back panel between the top panel and the bottom panel;
a second side panel joined along a fourth edge of the back panel between the top panel and the bottom panel such that the top panel, bottom panel, first side panel, and second side panel define a chamber having an opening thereto;
a first door panel selectively covering a first portion of the opening;
a second door panel selectively covering a second portion of the opening; and
a divider panel extending from a front surface of the back panel between the top panel and the bottom panel;
wherein:
the divider panel divides the chamber into a utility connection volume defined by the top panel, the divider panel, the bottom panel, and the first side panel and a transfer switch connection volume defined by the top panel, the divider panel, the bottom panel, and the second side panel; and
the divider panel includes an aperture extending therethrough for allowing the utility connection volume to communicate with the transfer switch connection volume.

7. The housing of claim 6 wherein the first door panel and the second door panel are independently secured to at least one of the top panel, bottom panel, first side panel, and second side panel.

8. The housing of claim 6 wherein the first door panel includes a locking arrangement for retaining the first door panel in a closed position so as to prevent access to the utility connection volume through the first portion of the opening.

9. The housing of claim 6 further comprising a first switch received in the utility connection volume and being supported by the front surface of the back panel, the first switch including a first switch member movable between a first switch position and a second switch position to selectively connect a load to a utility power supply and wherein the first door panel includes a switch opening extending therethrough for receiving the first switch member.

10. The housing of claim 9 further comprising a locking structure for maintaining the first switch member in one of the first or second switch positions.

11. The housing of claim 9 further comprising a transfer switch receivable within the transfer switch connection volume and wherein:
the transfer switch is supported by the front surface of the back panel;
the transfer switch includes a second switch member movable between a first switch position and a second switch position to selectively connect a load to one of the utility power supply and a secondary power supply; and
the second door panel includes a switch opening extending therethrough for receiving the second switch member.

12. The housing of claim 11 further comprising a cover panel removably connected to at least one of the top panel, bottom panel, first side panel, and second side panel so as to cover at least a portion of the first and second door panels to prevent access to the first and second switch members.

13. The housing of claim 9 wherein one of the top panel, the bottom panel, and the first side panel has a utility opening extending therethrough and wherein the first switch further comprises:
a first pair of terminals configured to receive a pair of electrical conductors connectable to the utility power supply; and
a second pair of terminals configured to receive a pair of electrical conductors connectable to the load.

14. The housing of claim 13 further comprising a transfer switch receivable within the transfer switch connection volume and wherein one of the top panel, the bottom panel, and the second side panel has a load opening extending therethrough and the transfer switch is operatively connected to the front surface of the back panel.

15. The housing of claim 14 wherein the transfer switch is one of a manually operated switch member or an electronically controlled switch member.

16. A housing for a transfer switch comprising:
an enclosure defined by:
a back panel having a front surface;
a plurality of sides extending from the back panel and defining a chamber;
a divider panel positioned in the chamber for dividing the chamber into a first volume and a second volume;
a first door panel operatively connectable to the enclosure for selectively preventing access to the first volume, the first door panel includes an opening extending therethrough to receive a first switch member; and
a second door panel operatively connectable to the enclosure for selectively preventing access to the second volume;
wherein:
one of the plurality of sides has a utility opening extending therethrough;
the front surface of the back panel includes a first mounting surface communicating with the first volume for receiving a first switch thereon, the first switch further including:
a first pair of terminals configured to receive a pair of electrical conductors connected to a utility grid; and
a second pair of terminals configured to receive a pair of electrical conductors connected to a load; and
the first switch member selectively connects the load to the utility grid.

17. The housing of claim 16 wherein:
one of the plurality of sides has a load opening extending therethrough; and
the front surface of the back panel includes a second mounting surface communicating with the second volume for receiving the transfer switch thereon.

18. The housing of claim 17 wherein the divider panel includes an opening for allowing communication between the first and second volumes.

* * * * *